(12) United States Patent
Rihn et al.

(10) Patent No.: US 9,154,511 B1
(45) Date of Patent: Oct. 6, 2015

(54) TIME ZERO DETECTION OF INFECTIOUS MESSAGES

(75) Inventors: Jennifer Rihn, Mountain View, CA (US); Jonathan J. Oliver, San Carlos, CA (US)

(73) Assignee: Dell Software Inc., Round Rock, TX (US)

( * ) Notice: Subject to any disclaimer, the term of this patent is extended or adjusted under 35 U.S.C. 154(b) by 366 days.

(21) Appl. No.: 11/156,372

(22) Filed: Jun. 16, 2005

Related U.S. Application Data

(60) Provisional application No. 60/587,839, filed on Jul. 13, 2004.

(51) Int. Cl.
*G06F 21/56* (2013.01)
*H04L 29/06* (2006.01)

(52) U.S. Cl.
CPC ............ *H04L 63/14* (2013.01); *H04L 63/1408* (2013.01); *H04L 63/1416* (2013.01); *H04L 63/1425* (2013.01)

(58) Field of Classification Search
CPC . H04L 63/14; H04L 63/1408; H04L 63/1416; H04L 63/1425
USPC .......................................................... 726/22
See application file for complete search history.

(56) References Cited

U.S. PATENT DOCUMENTS

| | | |
|---|---|---|
| 5,319,776 A | 6/1994 | Hile et al. |
| 5,452,442 A | 9/1995 | Kephart |
| 5,623,600 A | 4/1997 | Ji et al. |
| 5,826,269 A | 10/1998 | Hussey |
| 5,832,208 A | 11/1998 | Chen et al. |
| 5,889,943 A | 3/1999 | Ji et al. |
| 5,956,481 A | 9/1999 | Walsh et al. |
| 6,035,423 A | 3/2000 | Hodges et al. |
| 6,112,227 A | 8/2000 | Heiner |
| 6,144,934 A | 11/2000 | Stockwell et al. |
| 6,199,102 B1 | 3/2001 | Cobb |
| 6,560,632 B1 | 5/2003 | Chess et al. |
| 6,650,890 B1 | 11/2003 | Irlam et al. |
| 6,701,440 B1 | 3/2004 | Kim et al. |
| 6,732,279 B2 | 5/2004 | Hoffman |

(Continued)

FOREIGN PATENT DOCUMENTS

| | | |
|---|---|---|
| JP | 2005-011325 | 1/2005 |
| JP | 2005-259141 | 9/2005 |

(Continued)

OTHER PUBLICATIONS

"Sams Teach Yourself Microsoft® Outlook™ 2000 in 10 Minutes" © 1999 Sams Publishing. excerpt from Chapter 8, "Using the Rules Wizard" (3 pages).*

(Continued)

*Primary Examiner* — Joseph P Hirl
*Assistant Examiner* — Thomas Gyorfi
(74) *Attorney, Agent, or Firm* — Lewis Roca Rothgerber LLP

(57) ABSTRACT

Detecting infectious messages comprises performing an individual characteristic analysis of a message to determine whether the message is suspicious, determining whether a similar message has been noted previously in the event that the message is determined to be suspicious, classifying the message according to its individual characteristics and its similarity to the noted message in the event that a similar message has been noted previously.

19 Claims, 5 Drawing Sheets

(56) References Cited

U.S. PATENT DOCUMENTS

| | | | |
|---|---|---|---|
| 6,757,830 B1 | 6/2004 | Tarbotton et al. | |
| 6,763,462 B1 | 7/2004 | Marsh | |
| 6,763,467 B1 | 7/2004 | Radatti et al. | |
| 6,802,012 B1 | 10/2004 | Smithson et al. | |
| 6,813,712 B1 | 11/2004 | Luke | |
| 6,886,099 B1 | 4/2005 | Smithson et al. | |
| 6,892,241 B2 | 5/2005 | Kouznetsov et al. | |
| 6,898,715 B1 | 5/2005 | Smithson et al. | |
| 6,901,519 B1 | 5/2005 | Stewart et al. | |
| 6,941,348 B2 | 9/2005 | Petry et al. | |
| 6,941,466 B2 | 9/2005 | Mastrianni | |
| 6,944,555 B2 | 9/2005 | Blackett et al. | |
| 6,954,858 B1 | 10/2005 | Welborn et al. | |
| 6,971,023 B1 | 11/2005 | Makinson et al. | |
| 6,993,660 B1 | 1/2006 | Libenzi et al. | |
| 7,007,302 B1 | 2/2006 | Jagger et al. | |
| 7,010,696 B1 | 3/2006 | Cambridge et al. | |
| 7,010,807 B1 | 3/2006 | Yanovsky | |
| 7,017,187 B1 | 3/2006 | Marshall et al. | |
| 7,020,895 B2 | 3/2006 | Albrecht | |
| 7,043,757 B2 | 5/2006 | Hoefelmeyer et al. | |
| 7,062,553 B2 | 6/2006 | Liang | |
| 7,069,583 B2 | 6/2006 | Yann et al. | |
| 7,117,358 B2 | 10/2006 | Bandini et al. | |
| 7,124,438 B2* | 10/2006 | Judge et al. | 726/22 |
| 7,143,356 B1 | 11/2006 | Shafrir et al. | |
| 7,159,149 B2 | 1/2007 | Spiegel et al. | |
| 7,213,260 B2* | 5/2007 | Judge | 726/3 |
| 7,257,842 B2 | 8/2007 | Barton et al. | |
| 7,263,561 B1 | 8/2007 | Green et al. | |
| 7,299,361 B1 | 11/2007 | Kim et al. | |
| 7,310,816 B1 | 12/2007 | Burns et al. | |
| 7,343,624 B1 | 3/2008 | Rihn | |
| 7,360,246 B2* | 4/2008 | Etoh et al. | 726/13 |
| 7,458,094 B2 | 11/2008 | Jackson | |
| 7,461,129 B2 | 12/2008 | Shah et al. | |
| 7,509,679 B2 | 3/2009 | Alagna et al. | |
| 7,526,809 B2 | 4/2009 | Liang et al. | |
| 7,647,321 B2* | 1/2010 | Lund et al. | 707/E17.059 |
| 7,673,002 B1 | 3/2010 | Damarla | |
| 7,748,038 B2 | 6/2010 | Olivier et al. | |
| 7,765,593 B1 | 7/2010 | Lowe et al. | |
| 7,774,229 B1 | 8/2010 | Dernehl et al. | |
| 8,122,508 B2 | 2/2012 | Rihn | |
| 8,429,232 B1 | 4/2013 | Appenzeller et al. | |
| 8,515,894 B2 | 8/2013 | Yu | |
| 8,850,566 B2 | 9/2014 | Rihn | |
| 8,955,106 B2 | 2/2015 | Rihn | |
| 8,955,136 B2 | 2/2015 | Rihn | |
| 2001/0005889 A1 | 6/2001 | Albrecht | |
| 2002/0004908 A1 | 1/2002 | Galea | |
| 2002/0091940 A1 | 7/2002 | Welborn et al. | |
| 2002/0116639 A1 | 8/2002 | Chefalas et al. | |
| 2002/0129277 A1 | 9/2002 | Caccavale | |
| 2002/0147780 A1 | 10/2002 | Liu et al. | |
| 2002/0178373 A1 | 11/2002 | Altschul et al. | |
| 2002/0194489 A1 | 12/2002 | Almogy et al. | |
| 2002/0194490 A1 | 12/2002 | Halperin et al. | |
| 2003/0074578 A1 | 4/2003 | Ford et al. | |
| 2003/0115485 A1 | 6/2003 | Milliken | |
| 2003/0120947 A1 | 6/2003 | Moore et al. | |
| 2003/0120950 A1 | 6/2003 | Hunt | |
| 2003/0154394 A1 | 8/2003 | Levin | |
| 2003/0158905 A1* | 8/2003 | Petry et al. | 709/206 |
| 2003/0167402 A1 | 9/2003 | Stolfo et al. | |
| 2003/0172166 A1* | 9/2003 | Judge et al. | 709/229 |
| 2003/0172302 A1* | 9/2003 | Judge et al. | 713/201 |
| 2003/0191969 A1* | 10/2003 | Katsikas | 713/201 |
| 2003/0204569 A1 | 10/2003 | Andrews et al. | |
| 2003/0233418 A1 | 12/2003 | Goldman | |
| 2004/0015718 A1 | 1/2004 | DeClouet | |
| 2004/0015726 A1 | 1/2004 | Szor | |
| 2004/0024639 A1 | 2/2004 | Goldman | |
| 2004/0030913 A1 | 2/2004 | Liang et al. | |
| 2004/0054917 A1 | 3/2004 | Obrecht et al. | |
| 2004/0059697 A1 | 3/2004 | Forman | |
| 2004/0073617 A1 | 4/2004 | Milliken | |
| 2004/0073810 A1 | 4/2004 | Dettinger et al. | |
| 2004/0083384 A1 | 4/2004 | Hypponen | |
| 2004/0117648 A1 | 6/2004 | Kissel | |
| 2004/0128355 A1* | 7/2004 | Chao et al. | 709/206 |
| 2004/0128536 A1 | 7/2004 | Elzam et al. | |
| 2004/0158554 A1 | 8/2004 | Trottman | |
| 2004/0158741 A1 | 8/2004 | Schneider | |
| 2004/0186893 A1 | 9/2004 | Ochiai | |
| 2004/0199594 A1* | 10/2004 | Radatti et al. | 709/206 |
| 2004/0210769 A1 | 10/2004 | Radatti et al. | |
| 2004/0230827 A1 | 11/2004 | Franczek et al. | |
| 2004/0255159 A1 | 12/2004 | Williamson et al. | |
| 2005/0015624 A1 | 1/2005 | Ginter et al. | |
| 2005/0055410 A1 | 3/2005 | Landsman et al. | |
| 2005/0060643 A1 | 3/2005 | Glass et al. | |
| 2005/0081051 A1 | 4/2005 | Girouard et al. | |
| 2005/0081059 A1 | 4/2005 | Bandini et al. | |
| 2005/0108338 A1 | 5/2005 | Simske et al. | |
| 2005/0108339 A1 | 5/2005 | Gleeson et al. | |
| 2005/0111367 A1 | 5/2005 | Chao et al. | |
| 2005/0125667 A1 | 6/2005 | Sullivan et al. | |
| 2005/0138432 A1 | 6/2005 | Ransom et al. | |
| 2005/0149749 A1 | 7/2005 | Van Brabant | |
| 2005/0210272 A1 | 9/2005 | Fotta | |
| 2005/0251862 A1 | 11/2005 | Talvitie | |
| 2005/0283837 A1 | 12/2005 | Olivier et al. | |
| 2006/0010213 A1 | 1/2006 | Mehta | |
| 2006/0010495 A1 | 1/2006 | Cohen et al. | |
| 2006/0053490 A1 | 3/2006 | Herz et al. | |
| 2006/0265745 A1* | 11/2006 | Shackleton et al. | 726/22 |
| 2006/0288414 A1 | 12/2006 | Kuroda | |
| 2007/0294765 A1 | 12/2007 | Rihn | |
| 2008/0104703 A1 | 5/2008 | Rihn | |
| 2008/0134336 A1 | 6/2008 | Rihn | |
| 2012/0151590 A1 | 6/2012 | Rihn | |
| 2014/0373149 A1 | 12/2014 | Rihn | |
| 2015/0106936 A1 | 4/2015 | Rihn | |

FOREIGN PATENT DOCUMENTS

| | | |
|---|---|---|
| WO | WO 2005/076135 | 8/2005 |
| WO | WO 2005/116804 | 12/2005 |
| WO | WO 2005/124600 | 12/2005 |
| WO | WO 2006/009620 | 1/2006 |

OTHER PUBLICATIONS

Document properties of the Applicant-supplied reference "What are n-grams good for?", published Oct. 18, 2002.*

Postel, Jonathan. "RFC 821: Simple Mail Transfer Protocol". originally published Aug. 1982. http://www.faqs.org/ftp/rfc/pdf/rfc821.txt.pdf.*

Crocker, David H. "RFC 822: Standard for the Format of ARPA Internet Text Messages" originally published Aug. 13, 1982. http://www.faqs.org/ftp/rfc/pdf/rfc822.txt.pdf.*

"Spam Guard Network—eMail-Spam Filtering Desktop Software" Published May 27, 2012 as verified by the Internet Archive. http://web.archive.org/web/20020527012857/http://www.spamguard.net/.*

Webster's II New Riverside Dictionary definition for "intrinsic" © 1984, 1988 Houghton Mifflin Co. (4 pages).*

Various definitions for "intrinsic" from Dictionary.com © 1995-2009 by various. (2 pages) http://dictionary.reference.com/dic?q=intrinsic&search=search.*

"WindowsSecurity.com Email Security Testing Zone" Published Feb. 7, 2003 and Mar. 4, 2003 as verified by the Internet Archive (11 pages) http://web.archive.org/web/20030207121425/http://www.windowsecurity.com/emailsecuritytest/ and http://web.archive.org/web/20030304211950/www.windowsecurity.com/emailsecuritytest/faq.htm.*

"FileEXT Facts" Published Nov. 23, 2003 as verified by the Internet Archive (3 pages) http://web.archive.org/web/20031123132118/http://filext.com/faq/idx/0/017/article/.*

Murhammer, Martin et al. "IP Network Design Guide" © 1999 IBM Redbooks. Excerpt from Chapter 6 (32 pages).*

(56) References Cited

OTHER PUBLICATIONS

Paul Festa. "ISP software puts squeeze on spam" Published Jun. 16, 2003. © 2003 Cnet News. (3 pages) http://news.cnet.com/ISP-software-puts-squeeze-on-spam/2100-1032_3-1017930.html.*
Adam Turner. "Canning Spam" Published Apr. 6, 2004. © 2004 Sydney Morning Herald. (5 pages) http://www.smh.com.au/articles/2004/04/05/1081017087281.html.*
"Vispa Introduce Mail Guardian spam & virus filtering" Published Apr. 14, 2004 from M2 Presswire. http://goliath.ecnext.com/coms2/gi_0199-226559/Vispa-introduce-Mail-Guardian-spam.html.*
Wikipedia article for "Echelon (signals intelligence)" as originally published on Mar. 27, 2004 (2 pages). http://en.wikipedia.org/w/index.php?title=Echelon_%28signals_intelligence%29&oldid=3030420&printable=yes.*
Brain, Marshall. "How Web Servers Work: The Internet" Published Jun. 5, 2003 as verified by the Internet Archive (2 pages) http://web.archive.org/web/20030605034818/computer.howstuffworks.com/web-server2.htm.*
Dwork, Cynthia, et al. "Pricing via Processing or Combating Junk Mail," CRYPTO '92, Springer-Verlag LNCS 740, pp. 139-147, 1992.
Von Ahn, Luis, et al., "Telling Humans and COmputers Apart (Automatically) or How Lazy Cryptographers do AI," Communications to the ACM, Feb. 2004.
Skoll, David F., "How to Make Sure a Human is Sending You Mail," Google Groups Thread (Nov. 17, 1996).
Byrne, Julian, "My Spamblock," Google Groups Thread (Jan. 19, 1997).
Guilmette, Ronald F., "To Mung or Not to Mung," Google Groups Thread (Jul. 24, 1997).
Templeton, Brad, "Viking-12 Junk E-Mail Blocker," (believed to have last been updated Jul. 15, 2003).
"Majordomo FAQ," Oct. 20, 2001.
Langberg, Mike, "Spam Foe Needs Filter of Himself," (Email Thread Dated Apr. 5, 2003).
McCullagh, Declan, "In-Boxes that Fight Back," News.com, May 19, 2003.
Bastrup et al., Language Detection based on Unigram Analysis and Decision Trees.
Lee et al., RFC 1738, Uniform Resource Locators (URL), Dec. 1994.
Louis Chua, Zero-day Attacks, ComputerWorld, vol. 10, Issue No. 22, Jun. 9-22, 2004.
Collins et al., Efficient Induction of Finite State Automata, 1996.
Basis Technology, Language Identifier, Automatically Identify the Language and Encoding of Incoming Text, 2004, http:/www.basistech.com/language%2Didentification/.
Vidal et al., PASCAL-Pattern Analysis, Statistical Modelling and Computational Learning, Probabilistic Finite State Automata—Part 1, IEEE Transaction PAMI.
Joel Snyder, Definition of Zero Day Protection, Aug. 9, 2004, http://seclists.org/lists/focus-ids/2004/Aug/0046.html.
McAfee, Security Headquarters, http://www.mcafeesecurity.com/us/security/home.asp.
Kaspersky Lab, Review of 2004 Shows Malware Continuing at Unrelenting Pace, http://www.kaspersky.com/news?id=155897089.
Avinti, iSolation Server v.2, Whitepaper.
What are n-grams good for? http://www.cs.jhu.edu/~jason/465/PDFSlides/lect3-ngram-apps.pdf.
Ian Betteridge, Windows JPEG Exploit Ventures into the Wild, Sep. 28, 2004, http://www.eweek.com/article2/0,1759,165977,00.asp.
Oliver et al., Unsupervised Learning Using MML.
Cheeseman et al., AAAI88, The Seventh National Conference on Artificial Intelligence, Bayesian Classification, Aug. 21-28, 1988, vol. 2.
Mailfrontier, MailFrontier Anti-Virus: A Complete Solution to Protect Your Network from Outbreaks.
Brian Livingston, How Long Must You Wait for an Anti-Virus Fix?, http://itmanagement.earthweb.com/columns/executive_tech/article.php/3316511.
Postini, Postini White Paper, Email Intrusion Prevention: Stop Malicious Threats before They Harm Your Email System.
Messagelabs, MessageLabs Anti-Virus, How it works, http://www.messagelabs.com/services/antivirus/detail.
Ironport, Press Release, Iron Port Systems™ Introduces "Virus Outbreak Filters" to Predict New Outbreaks, Protect Customer Networks, Jun. 14, 2004.
B.R. Gaines, Behaviour/Structure Transformations Under Uncertainty, Mar. 1976.
Dana Angluin, Learning Regular Sets from Queries and Counterexamples, 1987.
Graham, Paul. "A Plan for Spam." Published Aug. 2002 (8 pages). http://www.paulgraham.com/spam.html.
Graham, Paul. "Better Bayesian Filtering." Pubilshed Jan. 2003 (13 pages). http://www.paulgraham.com/better.html.
Holtzman, Carey. "Spam Attack? Bayesian Filters to the Rescue!" Published Aug. 9, 2004 (7 pages). http://www.crn.com/white-box/59200920;jsessionid=E32QCZFQCXRMVQE1GHPCKHWATMY32JVN.
U.S. Appl. No. 13/400,548 Final Office Action mailed Nov. 5, 2013.
U.S. Appl. No. 13/400,548 Office Action mailed May 6, 2013.
U.S. Appl. No. 11/895,519 Final Office Action mailed Mar. 3, 2014.
U.S. Appl. No. 11/895,519 Office Action mailed Oct. 11, 2013.
Abhay, Joshi "How to Protect your Company from 'Zero-Day' Exploits," Published Mar. 1, 2004 by Computerworld.com (2 pages), http://www.computerworld.com/s/article/print/90447/How_to_protect_your_company_from_zero_day_exploits?taxonomyName=Security&taxonomyId=17.
U.S. Appl. No. 14/472,026 Office Action mailed on Mar. 12, 2015.
U.S. Appl. No. 11/927,438 Final Office Action mailed on Feb. 21, 2013.
U.S. Appl. No. 11/927,438 Office Action mailed on Jul. 13, 2012.
U.S. Appl. No. 11/927,438 Office Action mailed on Jun. 9, 2011.
U.S. Appl. No. 11/927,438 Final Office Action mailed on Jul. 12, 2010.
U.S. Appl. No. 11/927,438 Final Office Action mailed on Apr. 13, 2010.
U.S. Appl. No. 11/927,438 Office Action mailed on Sep. 29, 2009.
U.S. Appl. No. 11/156,373 Office Action mailed Sep. 5, 2007.
U.S. Appl. No. 11/927,424 Office Action mailed Jun. 24, 2011.
U.S. Appl. No. 11/927,424 Final Office Action mailed Nov. 16, 2010.
U.S. Appl. No. 11/927,424 Office Action mailed May 25, 2010.
U.S. Appl. No. 11/895,519 Final Office Action mailed on Nov. 16, 2009.
U.S. Appl. No. 11/895,519 Office Action mailed on Mar. 31, 2009.

* cited by examiner

TIME ZERO DETECTION OF INFECTIOUS MESSAGES

CROSS REFERENCE TO OTHER APPLICATIONS

This application claims priority to U.S. Provisional Patent Application No. 60/587,839 entitled DETECTING MALICIOUS MESSAGE ON DAY ZERO filed Jul. 13, 2004 which is incorporated herein by reference for all purposes.

BACKGROUND OF THE INVENTION

Computer viruses and worms are often transmitted via electronic messages. An infectious message usually comes in the form of an e-mail with a file attachment, although other forms of infection are possible. Attackers have exploited many protocols that exchange electronic information, including email, instant messaging, SQL protocols, Hyper Text Transfer Protocols (HTTP), Lightweight Directory Access Protocol (LDAP), File Transfer Protocol (FTP), telnet, etc. When the attachment is opened, the virus executes. Sometimes the virus is launched through a link provided in the email. Virus or worm attacks can cause considerable damage to organizations. Thus, many anti-virus solutions have been developed to identify viruses and prevent further damage. Currently, most anti-virus products use virus signatures based on known viruses for identification. Such systems, however, often do not protect the network effectively during the time window between a virus' first appearance and the deployment of its signature. Networks are particularly vulnerable during this time window, which is referred to as "time zero" or "day zero". For a typical anti-virus system to function effectively, it usually requires viruses to be identified, their signatures developed and deployed. Even after the system adapts after an outbreak, time zero threat can sometimes re-immerge as the virus mutates, rendering the old signature obsolete.

One approach to time zero virus detection is to use a content filter to identify and quarantine any message with a potentially executable attachment. This approach is cumbersome because it could incorrectly flag attachments in Word, Excel and other frequently used document formats even if the attachments are harmless, resulting in high rate of misidentification (also referred to as false positives). Furthermore, the approach may not be affective if the virus author disguises the nature of the attachment. For example, some virus messages ask the recipients to rename a .txt file as .exe and then click on it. Sometimes the virus author exploits files that were not previously thought to be executable, such as JPEG files. Therefore, it would be useful to have a better time zero detection technique. It would also be desirable if the technique could detect viruses more accurately and generate fewer false positives.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting infectious messages is disclosed. Analysis of individual characteristics of messages is performed in some embodiments to determine whether the message is suspicious. If a message is deemed suspicious, it is determined whether a similar message has been noted previously as possibly suspicious. If a similar message has been previously noted, the message is classified according to its individual characteristics and its similarity to the noted message. In some embodiments, if a message that was forwarded is later found to be infectious, the infectious message is reported to human or machine agents for appropriate action to take place.

Figure 1:
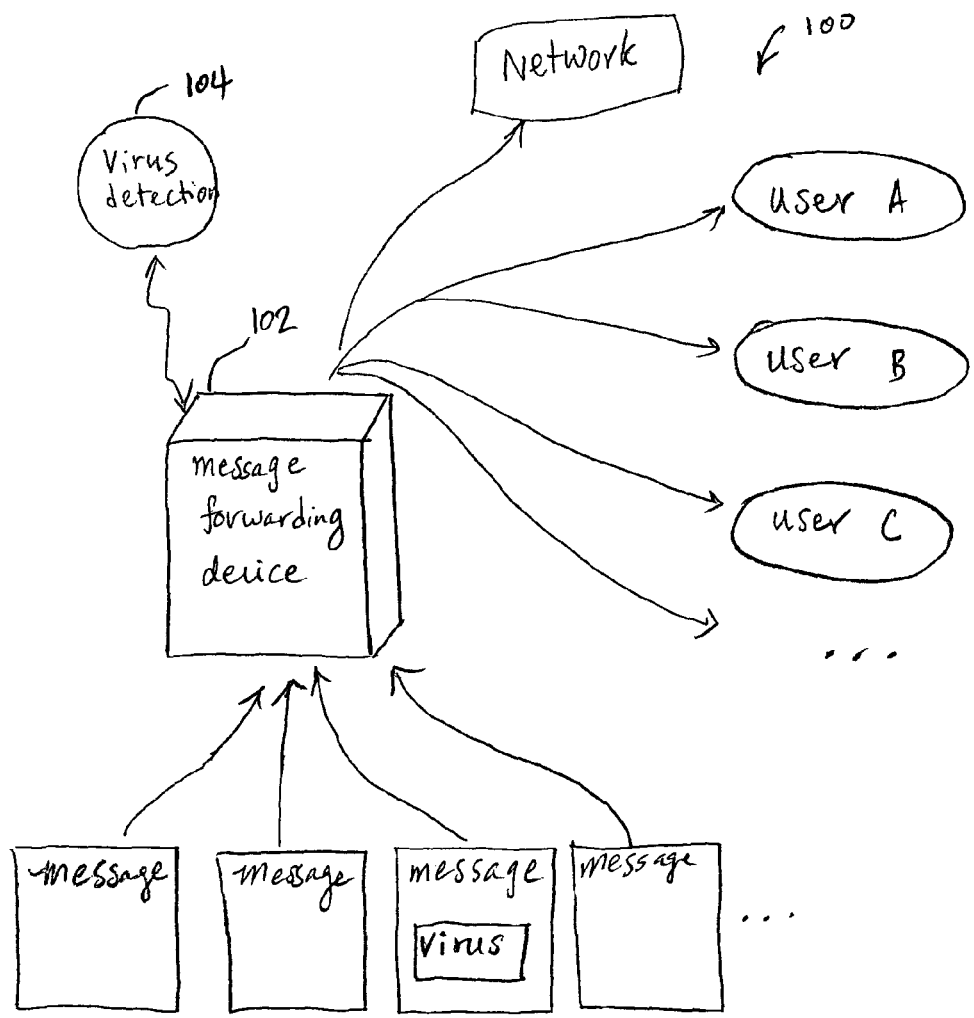
FIG. 1 is a system diagram illustrating an embodiment of a message delivery system.

FIG. 1 is a system diagram illustrating an embodiment of a message delivery system. In this example, message forwarding device 102 may be implemented as a mail server or gateway or other appropriate device. The message forwarding device is configured to forward messages received on its input interface. As used herein, forwarding includes sending a message to email servers or gateways, networking devices, email clients of individual recipients, or any other appropriate locations in the message's path of flow. Some of the messages to be forwarded may be infectious (i.e. containing viruses, worms or other items that may cause unwanted behavior on the recipient's device and/or the network). In this example, an infectious message detection mechanism 104 cooperates with the message forwarding device to identify the virus and prevents infectious messages from further spreading. In some embodiments, the virus detection mechanism is implemented as software, firmware, specialized hardware or any other appropriate techniques on the message forwarding device. In some embodiments, the detection mechanism is implemented on a separate device.

Figure 2:
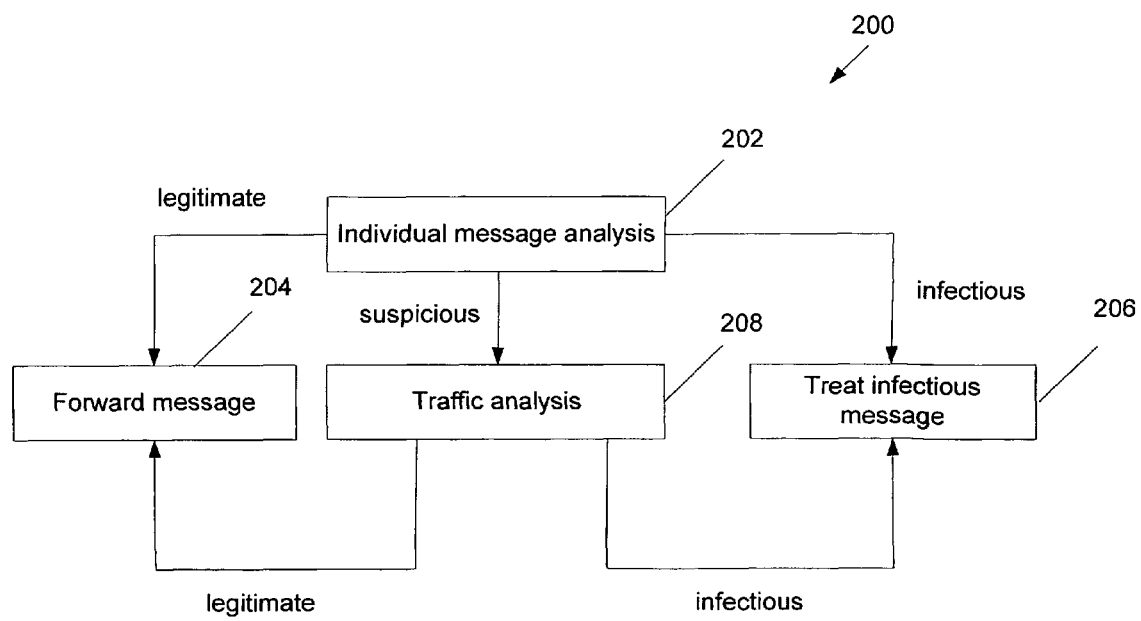
FIG. 2 is a flowchart illustrating a process embodiment for detecting infectious messages.

FIG. 2 is a flowchart illustrating a process embodiment for detecting infectious messages. Process 200 may be implemented on a message forwarding device, a standalone device, or as a part of another network monitoring/security device for any other appropriate device systems. In this example, an individual message analysis is performed initially (202). As will be shown in more details below, the individual message analysis evaluates the intrinsic characteristics of the message, determines the probability of the message being infectious, and classifies the message. In some embodiments, the message is classified as legitimate, suspicious or infectious based on the probability. The message is determined to be legitimate if the probability is below a legitimate threshold, infectious if the probability exceeds an infectious threshold, and suspicious if the probability is somewhere between the two thresholds. Other evaluations and classification techniques are used in different embodiments.

In the process shown, if a message is determined to be legitimate, the message is forwarded to the appropriate recipient (204). If the message is determined to be infectious, the message is treated as appropriate (206). In some embodiments, the message is quarantined or deleted from the delivery queue. If a message is deemed to be suspicious, a traffic analysis is performed on the suspicious message (208). The traffic analysis identifies any traffic spike in the e-mail message stream that is consistent with the pattern of a virus outbreak. Details of the traffic analysis are described below. In this example, analysis of a message in the context of all message traffic yields another probability of the message being infectious, and classifies the suspicious message as either legitimate or infectious according to the probability. Legitimate messages are processed normally and forwarded to their destinations (204). Infectious messages are treated appropriately (206). Other classifications are also possible. The order of the analyses may be different in some implementations and some embodiments perform the analysis in parallel. In some embodiments, each analysis is performed independently.

Figure 3:
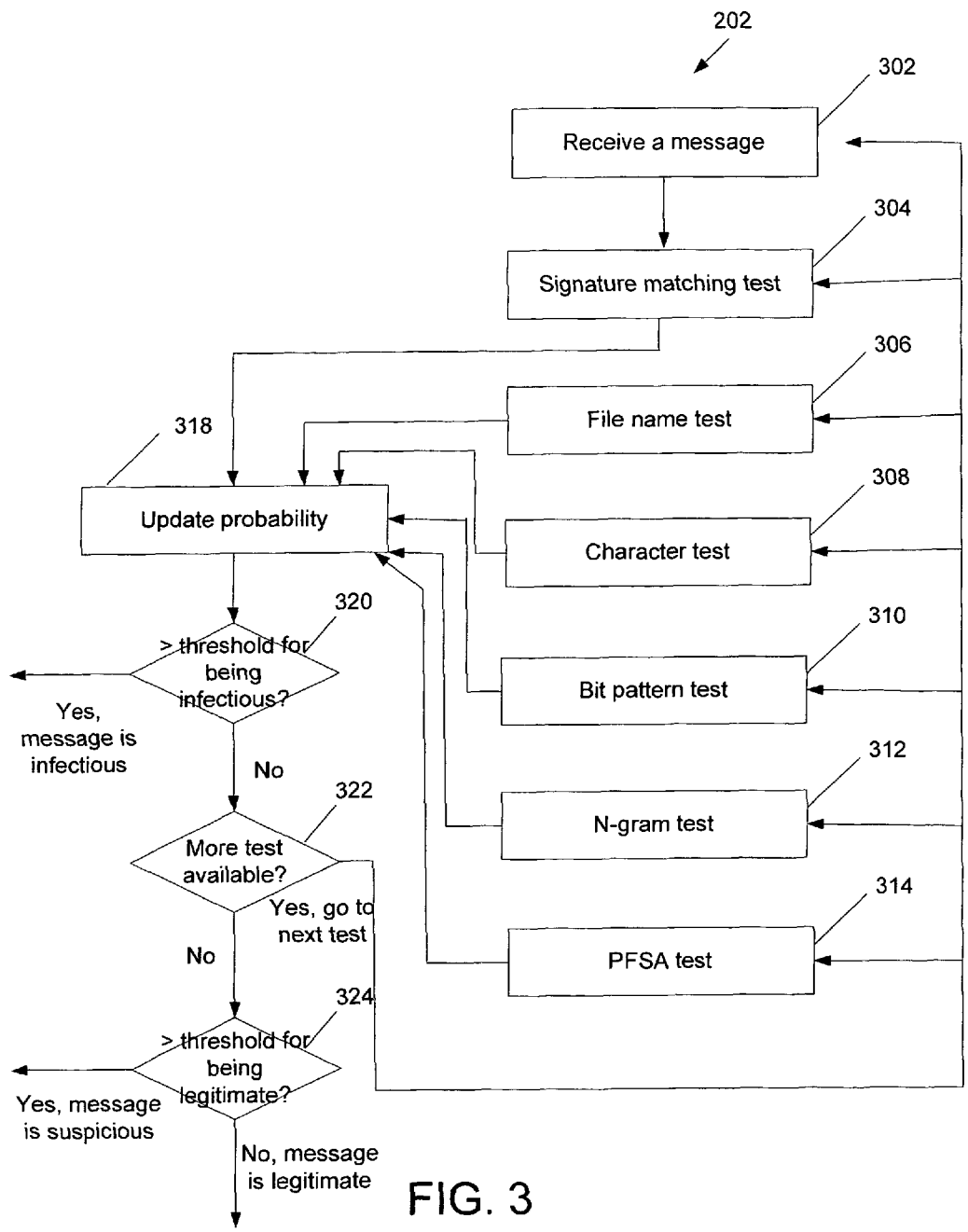
FIG. 3 is a flowchart illustrating the implementation of the individual message analysis according to some embodiments.

FIG. 3 is a flowchart illustrating the implementation of the individual message analysis according to some embodiments. In this example, process 202 initiates when a message is received (302). The message is then submitted to a plurality of tests configured to examine the characteristics of the message and detect any anomalies. After each test, the probability of the message being infectious is updated according to the test result (318). In some embodiments, the weight of different test results in calculating the probability may vary.

It is then determined whether the probability exceeds the threshold for the message to be deemed infectious (320). If so, the message is considered infectious and may be quarantined, deleted from send queue, or otherwise appropriately handled. If, however, the probability does not exceed the threshold, it is determined whether more tests are available (322). If so, the next available test is applied and the process of updating probability and testing for threshold is repeated. If no more tests are available, the probability is compared to the threshold required for a legitimate message (324). If the probability exceeds the legitimate threshold, the message is deemed to be suspicious. Otherwise, the tests indicate that the message is legitimate. The classification of the message is passed on to the next routine. According to process 200, depending on whether the message is legitimate, suspicious or infectious, the next routine may forward the message, perform traffic analysis on the message, or treat the message as infectious.

Examples of the tests used in the individual message analysis include signature matching tests (304), file name tests (306), character tests (308), bit pattern tests (310), N-gram tests (312), bit pattern test (314), and probabilistic finite state automata (PFSA) tests (316). The tests may be arranged in any appropriate order. Some tests maybe omitted and different tests may be used.

Some of the tests analyze the intrinsic characteristics of the message and/or its attachments. In the embodiments shown, the signature matching test (304) compares the signature of the message with the signatures of known viruses. The test in some embodiments generates a probability on a sliding scale, where an exact match leads to a probability of 1, and an inexact match receives a probability value that depends on the degree of similarity.

The file name test (306) examines the name of the attachment and determines if there is anomaly. For example, a file name such as "read me.txt.exe" is highly suspicious since it would appear that the sender is attempting to misrepresent the nature of the executable and pass the file off as a text file.

The character test (308) processes the content of the attachment and determines the possibility that the file maybe an infectious one. Characters that are unusual for the message file type indicate that the attachment has a higher likelihood of being infectious. For example, documents that purport to be text documents and contain many characters more common to an executable could be suspicious. In some embodiments, the character test examines certain portions of the message that is supposed to contain characters and omit the rest to avoid false positives. For example, if a document contains text and pictures, the character test will only process the text portion.

The bit pattern test (310) examines certain portions of the file and determines whether there is anomaly. Many files contain embedded bit patterns that indicate the file type. The magic number or magic sequence is such a bit pattern. For example, an executable file includes a particular bit pattern that indicates to the operating system that the file is an executable. The operating system will execute any file that starts with the magic sequence, regardless of the file extension. If an attachment has an extension such as .txt or .doc that seems to indicate that the file is textual in nature, yet the starting sequence in the file contains the magic sequence of an executable, then there is a high probability that the sender is attempting to disguise an executable as a text document. Therefore, the attachment is highly suspicious.

Some of the tests such as N-gram (312) and PFSA (314) measure the deviation of the received message from a baseline. In this example, the baseline is built from a collection of known good messages. An N-gram model describes the properties of the good messages. The N-gram model is a collection of token sequences and the corresponding probability of each sequence. The tokens can be characters, words or other appropriate entities. The test compares the N-gram model to an incoming message to estimate the probability that a message is legitimate. The probabilities of the N-gram sequences of the incoming messages can be combined with the probabilities of the N-gram sequences of the baseline model using any of several methods. In some embodiments, the N-gram test compares the test result with a certain threshold to determine the legitimacy of a message. In some embodiments, a message deemed legitimate by the N-gram test is not subject to further testing, thus reducing false positive rate. In some embodiments, a message found to be legitimate by the N-gram test is further tested to ascertain its true legitimacy.

In the example shown, the PFSA test (314) relies on a model that is built from a set of known good messages. The model describes the properties of legitimate messages. The model includes a plurality of token such as characters and words, and the probabilities associated with the tokens. The test estimates the probability that a particular message that includes a sequence of tokens can be generated by the model. In some embodiments, similar to the N-gram test, the test result is compared with a certain threshold to determine the legitimacy of a message. In some embodiments, a message deemed legitimate by the PFSA test is not subject to further testing to avoid false positives. In some embodiments, a message found to be legitimate by the PFSA test is further tested to ascertain its true legitimacy.

In some embodiments, information about previously received messages is collected and used to identify an increase in the number of similar and potentially suspicious messages. Messages are clustered to establish a statistical model that can be used to detect similar messages. The data collected may include one or more of the following: time of receipt, the recipients, number of recipients, the sender, size of the attachment, number of attachments, number of executable attachments, file name, file extension, file type according to the starting sequence of the file binary, etc. The characteristics of an incoming message are compared to the model to determine whether similar messages have been noted previously. A traffic spike in similar messages that were previously noted as potentially suspicious indicates the likelihood of a virus outbreak.

In some embodiments, traffic patterns are analyzed on a global network level. In other words, the analysis may monitor all the messages routed through an internet service provider and note the suspicious ones. In some embodiments, the traffic patterns are analyzed locally. For example, messages on a local network or on different subnets of a local network may be analyzed separately. In some embodiments, a combination of global and local analyses is used.

In local traffic analysis, different subnets can have different traffic patterns. For example, within a corporation, the traffic on the engineering department subnet may involve a large number of executables and binary files. Thus, absent other indicators, executables and binary attachments will not always trigger an alarm. In contrast, the traffic pattern of the accounting department may mostly involve text documents and spreadsheets, therefore an increase in binary or executable attachments would indicate a potential outbreak. Tailoring traffic analysis based on local traffic can identify targeted attacks as well as variants of old viruses.

Figure 4:
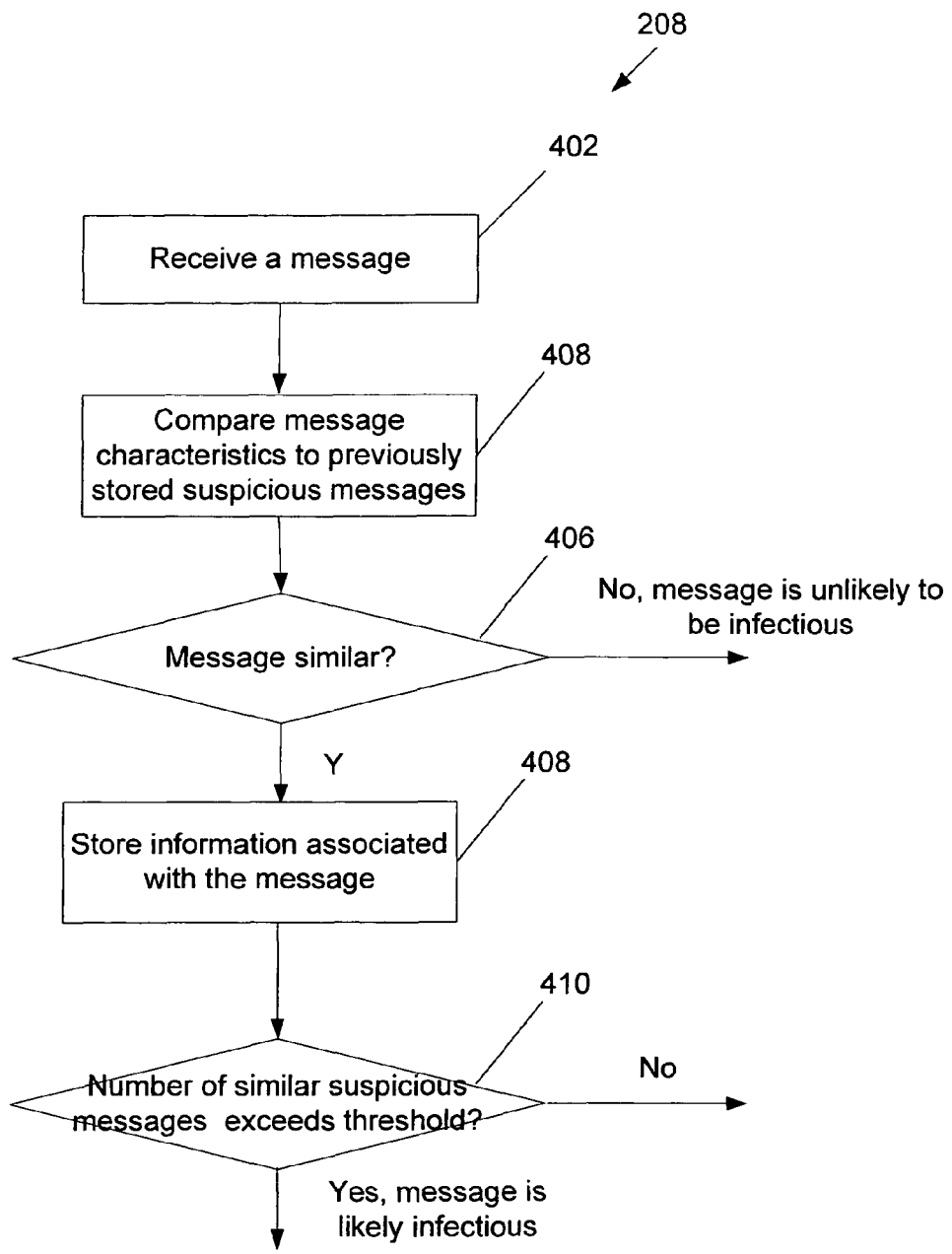
FIG. 4 is a flowchart illustrating an embodiment of traffic analysis.

FIG. 4 is a flowchart illustrating an embodiment of traffic analysis. Process 208 may be performed after the individual message analysis as shown in process 200, before the individual message analysis, in combination with other analysis, or independently. Process 208 initiates when a message is received (402). The characteristics of the message are compared to the characteristics of previously stored suspicious messages (404). In some embodiments, the system collects suspicious messages resulting from other tests such as the ones in the individual message analysis shown in FIG. 3.

It is then determined whether the message is similar to the previous stored messages (406). If the message is not similar to any of the previously stored suspicious messages, a low probability of infectiousness is assigned. If, however, the message is similar to previous stored suspicious messages, information associated with the received message is also stored and the statistical model is updated accordingly (408). It is then determined whether the number of such similar and suspicious messages has exceeded a predefined threshold (410). If not, the message is not classified as infectious at this point, although a higher probability may be assigned to it. If the total number of such suspicious messages has exceeded the threshold, it is likely that the message is indeed infectious and should be appropriately treated. For example, consider the case where the threshold number is set to 5, and there are already 4 instances of suspicious messages with executable attachments having the same extension and similar size. When a fifth message arrives with similar sized executable attachments with the same extension, the message will be classified as infectious. By selecting an appropriate threshold value, infectious messages can be detected and prevented without a major outbreak.

Figure 5:
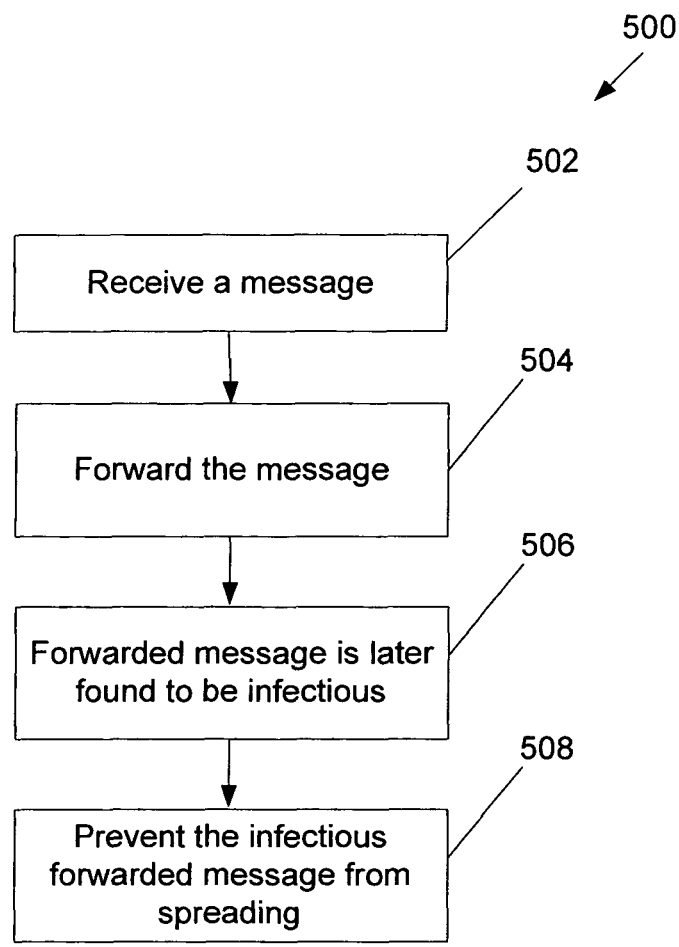
FIG. 5 is a flowchart illustrating another embodiment of traffic analysis.

Sometimes the system may initially find a message to be legitimate or merely suspicious and forward the message to its destination. Later as more information becomes available, the system may find the message to be infectious. FIG. 5 is a flowchart illustrating another embodiment of traffic analysis. Process 500 may be performed independently or in conjunction with other types of message analyses. In the example shown, a message is received (502). The message is initially determined to be legitimate and forwarded (504). Sometime after the message has been forwarded, the forwarded message is determined to be infectious (506). A message may be found as infectious according to any appropriate message analysis techniques, including those described in this specification. In some embodiments, information pertaining to the forwarded message is optionally stored in memory, on disk or in other forms of storage medium so that it can be used for the analysis. Again, consider the example where the threshold number in the traffic analysis is set to 5 and 4 similar messages have been received. Although these 4 messages are noted as suspicious, because the threshold is not met the messages are still forwarded. The characteristics of the suspicious messages are stored. When a similar fifth message is received, its characteristics are compared to the characteristics of the four previously noted messages. N-gram, PFSA or other appropriate techniques can be used in the comparison. The analysis shows that the number of similar and suspicious messages meets the threshold. Therefore, the fifth message is infectious, as are the four previously noted and forwarded messages.

Once an already forwarded message is deemed infectious, measures are taken to prevent the infectious forwarded message from spreading (508). In the example shown above, the system will take actions to keep the 4 instances of previously forwarded messages from being opened or resent by their recipients. Additionally, the system will not forward the fifth message. In some embodiments, the system reports the finding to the system administrator, the recipient, and/or other users on the network to prevent the previously forwarded infectious messages from further spreading. Warning messages, log messages or other appropriate techniques may be used. In some embodiments, the system generates a cancellation request to a forwarding agent such as the mail server, which will attempt to prevent the messages from being forwarded by deleting them from the send queue, moving the messages into a location to be quarantined or any other appropriate action.

Detecting and managing infectious messages have been disclosed. By performing individual message analysis and/or traffic analysis, infectious messages can be more accurately identified at time zero, and infectious messages that initially escaped detection can be later identified and prevented from further spreading.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting infectious messages, comprising:
   receiving an individual message at a message forwarding device in a local network, the local network in communication with a global network, wherein the individual message has not yet been delivered to one or more recipients in the local network;
   executing instructions stored in memory, wherein execution of the instructions by a processor:
      performs an analysis of the individual message to determine similarity to known viruses, wherein the message is classified suspicious, wherein the individual message is not yet classified as either legitimate or infectious, and
      determines that a message previously received at the local network has been classified as suspicious;
   receiving information related to monitoring of electronic mail traffic in the global network, the information identifying increases in global messages corresponding to the message previously received and classified as suspicious at the local network; and
   executing further instructions stored in memory, wherein execution of the instructions by the processor:
   reclassifies the individual message according to:
      the analysis of the individual message resulting in classification of the individual message as suspicious,
      the similarity of the individual message to the message previously received and classified as suspicious at the local network, and
      the presence of an increase in the global network of messages corresponding to the message previously received and classified as suspicious at the local network; and
      processes the individual message based on the reclassification whereby individual messages reclassified as infectious messages are quarantined from a delivery queue and not allowed to be redistributed by the message forwarding device in the local network.

2. The method of claim 1, wherein performing an analysis of the individual message includes calculating a probability that the message is infectious.

3. The method of claim 1, wherein performing an analysis of the individual message includes calculating a probability that the message is infectious, and wherein the individual message is determined to be suspicious if the probability is between a legitimate threshold and an infectious threshold.

4. The method of claim 1, wherein performing an analysis of the individual message includes performing a signature matching test to determine whether the individual message has a signature that is substantially similar to a known virus signature.

5. The method of claim 1, wherein performing an analysis of the individual message includes performing a file name test to detect a suspicious file name.

6. The method of claim 5, wherein the file name is suspicious when the extension of the file name does not correspond to a sequence in the file.

7. The method of claim 1, wherein performing an analysis of the individual message includes performing a character test to determine whether the individual message includes unusual characters for type of file accompanying the individual message.

8. The method of claim 7, wherein the unusual characters correspond to an extension for the type of file accompanying the individual message.

9. The method of claim 1, wherein performing an analysis of the individual message includes performing a bit pattern test to determine whether there is anomaly in the content of the individual message.

10. The method of claim 1, wherein performing an analysis of the individual message includes performing an N-gram test.

11. The method of claim 1, wherein performing an analysis of the individual message includes performing a probabilistic finite state automata (PFSA) test.

12. A non-transitory computer-readable storage medium having embodied thereon a program, the program being executable by a computing device to perform a method for detecting infectious messages, the method comprising:
   receiving an individual message at a local network, the local network in communication with a global network, wherein the individual message has not yet been delivered to one or more recipients in the local network;
   performing an analysis of the individual message to determine similarity to known viruses, wherein the message is classified as suspicious, wherein the individual message is not yet classified as either legitimate or infectious;
   determining that a message previously received at the local network has been classified as suspicious;
   receiving information related to monitoring electronic mail traffic in the global network, the information identifying increases in global messages corresponding to the message previously received and classified as suspicious at the local network;
   reclassifying the individual message according to:
      the analysis of the individual message resulting in classification of the individual message as suspicious,
      the similarity of the individual message to the message previously received and classified as suspicious at the local network, and
      the presence of an increase in the global network of messages corresponding to the message previously received and classified as suspicious at the local network; and
   processing the individual message based on the reclassification whereby individual messages reclassified as infectious messages are quarantined from a delivery queue and not allowed to be redistributed in the local network.

13. The non-transitory computer readable storage medium of claim 12, wherein performing an analysis of the individual message includes calculating a probability that the message is infectious.

14. The non-transitory computer readable storage medium of claim 12, wherein performing an analysis of the individual message includes performing a character test to determine whether the message includes unusual characters for a type of file accompanying the message.

15. The non-transitory computer-readable storage medium of claim 14, wherein the unusual characters correspond to an extension for the type of file accompanying the individual message.

16. The non-transitory computer readable storage medium of claim 12, wherein performing an analysis of an individual message includes performing a bit pattern test to determine whether there is anomaly in the content of the message.

17. The non-transitory computer readable storage medium of claim 12, wherein performing an analysis of the individual message includes performing an N-gram test.

18. The non-transitory computer-readable storage medium of claim 12, wherein performing an analysis of the individual message includes performing a file name test to detect a suspicious file name.

19. The non-transitory computer-readable storage medium of claim 18, wherein the file name is suspicious when the extension of the file name does not correspond to a sequence in the file.

* * * * *